US011875775B2

(12) United States Patent
Sima et al.

(10) Patent No.: US 11,875,775 B2
(45) Date of Patent: Jan. 16, 2024

(54) VOICE CONVERSION SYSTEM AND TRAINING METHOD THEREFOR

(71) Applicant: NANJING SILICON INTELLIGENCE TECHNOLOGY CO., LTD., Nanjing (CN)

(72) Inventors: Huapeng Sima, Nanjing (CN); Zhiqiang Mao, Nanjing (CN); Xuefei Gong, Nanjing (CN)

(73) Assignee: Nanjing Silicon Intelligence Technology Co., Ltd., Nanjing (CN)

( * ) Notice: Subject to any disclaimer, the term of this patent is extended or adjusted under 35 U.S.C. 154(b) by 411 days.

(21) Appl. No.: 17/430,793

(22) PCT Filed: Apr. 20, 2021

(86) PCT No.: PCT/CN2021/088507
§ 371 (c)(1),
(2) Date: Aug. 13, 2021

(87) PCT Pub. No.: WO2022/083083
PCT Pub. Date: Apr. 28, 2022

(65) Prior Publication Data
US 2022/0310063 A1 Sep. 29, 2022

(30) Foreign Application Priority Data
Oct. 21, 2020 (CN) .......................... 202011129857.5

(51) Int. Cl.
*G10L 25/24* (2013.01)
*G10L 15/06* (2013.01)
*G10L 15/16* (2006.01)

(52) U.S. Cl.
CPC ............ *G10L 15/063* (2013.01); *G10L 15/16* (2013.01); *G10L 25/24* (2013.01)

(58) Field of Classification Search
CPC ........ G10L 15/063; G10L 15/16; G10L 25/24
See application file for complete search history.

(56) References Cited

U.S. PATENT DOCUMENTS

| 2009/0222258 A1* | 9/2009 | Fukuda | .................... G10L 25/93 |
| | | | 704/203 |
| 2015/0161994 A1* | 6/2015 | Tang | ....................... G10L 15/02 |
| | | | 704/232 |

(Continued)

FOREIGN PATENT DOCUMENTS

| CN | 108777140 A | 11/2018 |
| CN | 109671423 A | 4/2019 |

(Continued)

*Primary Examiner* — Thomas H Maung
(74) *Attorney, Agent, or Firm* — Laine IP Oy

(57) ABSTRACT

The present disclosure proposes a speech conversion scheme for non-parallel corpus training, to get rid of dependence on parallel text and resolve a technical problem that it is difficult to achieve speech conversion under conditions that resources and equipment are limited. A voice conversion system and a training method therefor are included. Compared with the prior art, according to the embodiments of the present disclosure: a trained speaker-independent automatic speech recognition model can be used for any source speaker, that is, the speaker is independent; and bottleneck features of audio are more abstract as compared with phonetic posteriorGram features, can reflect decoupling of spoken content and timbre of the speaker, and meanwhile are not closely bound with a phoneme class, and are not in a clear one-to-one correspondence relationship. In this way, a problem of inaccurate pronunciation caused by a recognition error in ASR is relieved to some extent. Pronunciation accuracy of audio obtained by performing voice conversion by the bottleneck feature is obviously higher than that of a phonetic posteriorGram based method, and timbre is not (Continued)

significantly different. By means of a transfer learning mode, dependence on training corpus can be greatly reduced.

19 Claims, 6 Drawing Sheets

(56) References Cited

U.S. PATENT DOCUMENTS

2016/0248768 A1* 8/2016 McLaren .............. G10L 17/22
2021/0035551 A1* 2/2021 Stanton ............... G10L 13/04

FOREIGN PATENT DOCUMENTS

| CN | 111680591 A | 9/2020 |
| CN | 112017644 A | 12/2020 |

* cited by examiner

VOICE CONVERSION SYSTEM AND TRAINING METHOD THEREFOR

This disclosure claims priority to the Chinese Application No. 202011129857.5, filed with the China National Intellectual Property Administration on 21 Oct. 2020 and entitled "VOICE CONVERSION SYSTEM, METHOD, AND APPLICATION", which is incorporated herein by reference in its entirety.

FIELD OF THE INVENTION

The present disclosure relates to a field of speech calculation algorithms, and in particular, to a voice conversion system and a training method therefor.

BACKGROUND OF THE INVENTION

With the continual development of the computer technology and the continual deep research of the field of artificial intelligence, speech robots aimed at voice interactions gradually enter the public view. Emergence of the speech robots changes the nature of work of existing telephone services. Currently, the speech robots are applied to industries such as the real estate, education, finance, tourism, and the like to perform voice interaction functions, thus replacing people to interact with users in voice.

To optimize customer experience, it is an important orientation for improvement to convert a voice feature of the speech robot by the speech conversion technology.

The speech conversion technology is a research branch of speech signal processing, covering contents of the fields such as speaker recognition, speech recognition and speech synthesis, and is intended to change personalization information of speech while keeping original semantic information unchanged, so that speech of a specific speaker (that is, a source speaker) sounds like speech of another specific speaker (that is, a target speaker). Researches on the speech conversion technology have proceeded for years, and various methods have emerged in the field of speech conversion, a statistical conversion method of which represented by the Gaussian mixture model has become a typical method in this field. However, there still exist some defects in such algorithms. For example, the typical method of performing speech conversion by the Gaussian mixture model is mostly based on one-to-one speech conversion tasks, requiring using of a parallel text, that is, the source speaker and the target speaker use training sentences with the same contents. Spectral features of the training sentences need to be performed with a dynamic time warping (DTW) to be aligned frame by frame, and then a mapping relationship between the spectral features can be obtained through a model training. However, a text of non-parallel corpus is not parallel, and thus a speech conversion cannot be performed by the foregoing Gaussian mixture model.

SUMMARY OF THE INVENTION

To resolve the foregoing problem, embodiments of the present disclosure propose a speech conversion scheme for non-parallel corpus training, to get rid of dependence on parallel text, thus achieving voice conversion effects with a small sample, and resolving a technical problem that it is difficult to achieve speech conversion under conditions that resources and equipment are limited.

Embodiments of the present disclosure adopt the following technical solutions.

According to a first aspect, a voice conversion system is provided, including:

a speaker-independent automatic speech recognition model including at least a bottleneck layer, where the speaker-independent automatic speech recognition model is configured to convert a mel-scale frequency cepstral coefficients feature of an input source speech into a bottleneck feature of the source speech through the bottleneck layer, an Attention voice conversion network, configured to convert the bottleneck feature of the source speech into a mel-scale frequency cepstral coefficients feature in conformity with a target speech; and a neural network vocoder, configured to convert the mel-scale frequency cepstral coefficients feature in conformity with the target speech into and output a speech.

According to a second aspect, a voice conversion method is provided, including:

converting a mel-scale frequency cepstral coefficients feature of a source speech into a bottleneck feature of the source speech;

converting the bottleneck feature of the source speech into a mel-scale frequency cepstral coefficients feature in conformity with a target speech; and converting the mel-scale frequency cepstral coefficients feature in conformity with the target speech into speech for output.

According to a third aspect, a training method for a speaker-independent automatic speech recognition model is provided, including:

inputting a number of a character encoding to which a word in multi-speaker speech recognition training corpus is converted, together with a mel-scale frequency cepstral coefficients feature of the multi-speaker speech recognition training corpus, to the speaker-independent automatic speech recognition model; executing a backward propagation algorithm; and performing iterative optimization until the speaker-independent automatic speech recognition model is converged.

According to a fourth aspect, a training method for an Attention voice conversion network is provided, including:

converting a mel-scale frequency cepstral coefficients feature of a target speech into a bottleneck feature of the target speech;

inputting the bottleneck feature of the target speech into a basic Attention voice conversion network, wherein the mel-scale frequency cepstral coefficients feature corresponding to a target speaker is taken as a ground truth; and training the Attention voice conversion network by a method of Deep Transfer Learning.

According to a fifth aspect, a training method for a neural network vocoder is provided, including:

inputting a mel-scale frequency cepstral coefficients feature of a target speech and a voice signal of the target speech to a pre-trained neural network vocoder, and training the neural network vocoder by a method of Deep Transfer Learning.

According to a sixth aspect, a terminal is provided, including the voice conversion system described above.

According to a seventh aspect, a computer-readable storage medium is provided, where the computer-readable storage medium stores a computer program, and the computer program is configured to perform one of the foregoing methods while executed.

According to an eighth aspect, a voice conversion system is provided, including:

a speech recognition model including at least a bottleneck layer, where the speech recognition model is configured to:

convert a mel-scale frequency cepstral coefficients feature of an inputted source speech into a bottleneck feature through the bottleneck layer, and input the bottleneck feature to an Attention voice conversion network through the bottleneck layer; and the Attention voice conversion network configured to convert the inputted bottleneck feature into a mel-scale frequency cepstral coefficients feature in conformity with target speech; and a neural network vocoder, where the neural network vocoder is configured to convert the mel-scale frequency cepstral coefficients feature in conformity with the target speech into and output pseudo target speech, which is audio generated by the converting of the source speech.

According to a ninth aspect, a training method for a voice conversion system is provided, being applicable to the voice conversion system according to the fifth aspect described above, including:

converting a word in multi-speaker speech recognition training corpus to a number based on a mapping relationship between the word in the multi-speaker speech recognition training corpus and a character encoding;

inputting the converted number and a mel-scale frequency cepstral coefficients feature of the multi-speaker speech recognition training corpus to a speech recognition model;

executing a backward propagation algorithm; and performing iterative optimization until the speech recognition model is converged, so as to train the speech recognition model.

In the embodiments of the present disclosure, according to the foregoing technical solutions, the dependence on the parallel text is get rid of, and a conversion between any speaker to multiple speakers is achieved, thus improving flexibility, and resolving the technical problem that it is difficult to achieve speech conversion under conditions that resources and equipment are limited.

Specifically:

1. A trained speaker-independent automatic speech recognition model may be used for any source speaker, that is, the speaker is independent (speaker-independent, SI). A training method for the speaker-independent automatic speech recognition model needs to be performed only for one time, and subsequently it is just needed for a small sample that a corresponding feature is extracted by using a trained model, then to convert voice in a real-time manner, thereby satisfying requirements on real-time voice conversion.

2. Bottleneck (bottleneck) features of the audio are more abstract as compared with phonetic posteriorGram (PPG) features, can reflect decoupling of spoken content and timbre of the speaker, and meanwhile are not closely bound with a phoneme class, not in a clear one-to-one correspondence relationship. In this way, a problem of inaccurate pronunciation caused by a recognition error in ASR (automatic speech recognition, the automatic speech recognition technology) is relieved to some extent. In an actual test, pronunciation accuracy of audio obtained by performing voice conversion by the bottleneck feature is obviously higher than that of the PPG-based method, and there is no significant difference in timbre.

3. According to the embodiments of the present disclosure, quick training for voice conversion is achieved. Compared with a general voice conversion network, requirements on data volume are obviously reduced. According to the embodiments of the present disclosure, system training time may be shortened to 5 to 20 minutes. In this way, dependence on training corpus is greatly reduced, and practicability of the system is obviously enhanced.

BRIEF DESCRIPTION OF THE DRAWINGS

To describe the technical solutions of the present disclosure to be clearer, the accompanying drawings to be used for the embodiments are briefly described below. Obviously, persons of ordinary skills in the art can also derive other accompanying drawings according to these accompanying drawings without an effective effort.

DETAILED DESCRIPTION OF THE EMBODIMENTS

Figure 1:
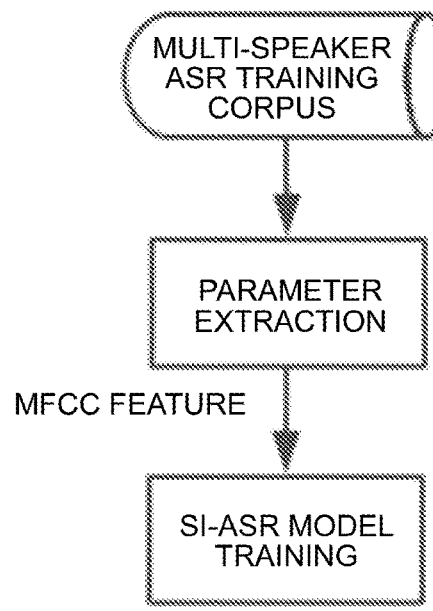
FIG. 1 is a flowchart of training for a speaker-independent automatic speech recognition model (SI-ASR model) according to an embodiment of the present disclosure.

The present disclosure is described in detail below with reference to the accompanying drawings and the specific embodiments. Obviously, the described embodiments are merely some and are not all of embodiments in accordance with the present disclosure. According to the embodiments of the present disclosure, all other embodiments derived by persons of ordinary skills in the art without an effective effort fall within the protection scope of the present disclosure.

According to an embodiment of the present disclosure, there is provided a voice conversion system, including the followings.

(1) A speaker-independent automatic speech recognition (SI-ASR) model, with a five-layer DNN (Deep Neural Network) structure, in which a fourth layer is a bottleneck layer to convert a mel-scale frequency cepstral coefficients (MFCC) feature of source speech into a bottleneck feature of the source speech;

The ASR model converts speech into text, and may output a probability of each of audio-corresponding words, where PPG is a carrier of the probability. A PPG-based method uses PGG as output of the SI-ASR model.

PPG i.e., Phonetic PosteriorGram, is a matrix that maps each time frame of the audio into a posterior probability for a certain phoneme class. The PPG may represent information about rhythms of spoken content of a segment of audio to some extent, with features related to a timbre of a speaker being removed therefrom. Therefore, the PPG is speaker independent. The PPG is defined as follows.

$$P\_t = (p(s|X\_t), s=1, 2, 3, \ldots C);$$

where C represents a number of phonemes; s represents a phoneme (represented by a number); Xt represents an MFCC feature of a $t^{th}$ frame of the audio; and P(s|Xt) represents a posterior probability of the phoneme s.

It is found in practice that although the PPG has a characteristic that a timbre feature of the speaker may be removed, a posterior probability outputted by the model may not be accurate because there is an error possibility in text recognition by the ASR model. This may result in occurrences of such cases that pronunciations of several words of audio outputted after a final conversion are inaccurate or wrong, or even noise may occur.

Regarding this problem, a speaker-independent automatic speech recognition model according to this embodiment of the present disclosure is provided to include a bottleneck layer to convert a mel-scale frequency cepstral coefficients feature of an inputted source speech into and output a bottleneck feature of the source speech, through the bottleneck layer, to an Attention voice conversion network.

Extraction of the bottleneck feature is related to construction of the ASR model. Different ASR models correspond to different depths. Taking a five-layer DNN neural network structure as an example, one layer thereof may be configured to be a bottleneck layer. In other words, one bottleneck layer (DNN) is placed in a four-layer DNN structure to form the ASR model. To achieve preferred effects, it is preferable that the bottleneck layer is provided to be an output of a third layer or a fourth layer of the ASR model. In other words, the output of the third layer or the fourth layer is taken as the bottleneck feature. It should be noted that it is preferable according to this embodiment of the present disclosure that the bottleneck layer is provided as the fourth layer of the ASR model, to avoid possible interference by timbre information at other positions.

A preferable example of the embodiments of the present disclosure is described in detail below, and is not intended to limit the protection scope of the embodiments of the present disclosure, that is, within the protection scope defined by claims for the embodiments of the present disclosure, others can still resolve the technical problem of the present disclosure.

A five-layer DNN structure is used in this embodiment, where a fourth layer thereof is a bottleneck layer. In other words, a three-layer DNN structure, one bottleneck layer (DNN), and a one-layer DNN structure form the ASR model. After the model is trained, an audio feature is inputted, and a result of bottleneck layer is outputted as a voice conversion feature. Different from an acoustic feature of the audio, the bottleneck feature is a language feature of the audio, without containing information about timbre and the like of the speaker. Through training the ASR model by using training corpus involving a lot of different speakers, common information of all of the speakers may be captured while personalization information of the speakers is removed. The bottleneck layer is generally a middle layer of the model. However, in order to make an outputted feature contain as less timbre information as possible, a network design is improved according to this embodiment of the present disclosure, so that the bottleneck layer is closest to output of an ASR network. Only in this way, an extracted feature does not contain timbre information. Therefore, according to this embodiment of the present disclosure, output of a second-to-last layer of the ASR network is extracted as the bottleneck feature. It has proved in practice that, in this way, the timbre information may be removed well while language information is retained.

The bottleneck features are more abstract as compared with the PPG features, can reflect decoupling of spoken content and timbre of the speaker, and meanwhile are not closely bound with a phoneme class, not in a clear one-to-one correspondence relationship. In this way, a problem of inaccurate pronunciation caused by a recognition error in ASR is relieved to some extent. In an actual test, pronunciation accuracy of audio obtained by performing voice conversion by using the bottleneck feature is obviously higher than that of the PPG-based method, and there is no significant difference in timbre.

Figure 5:
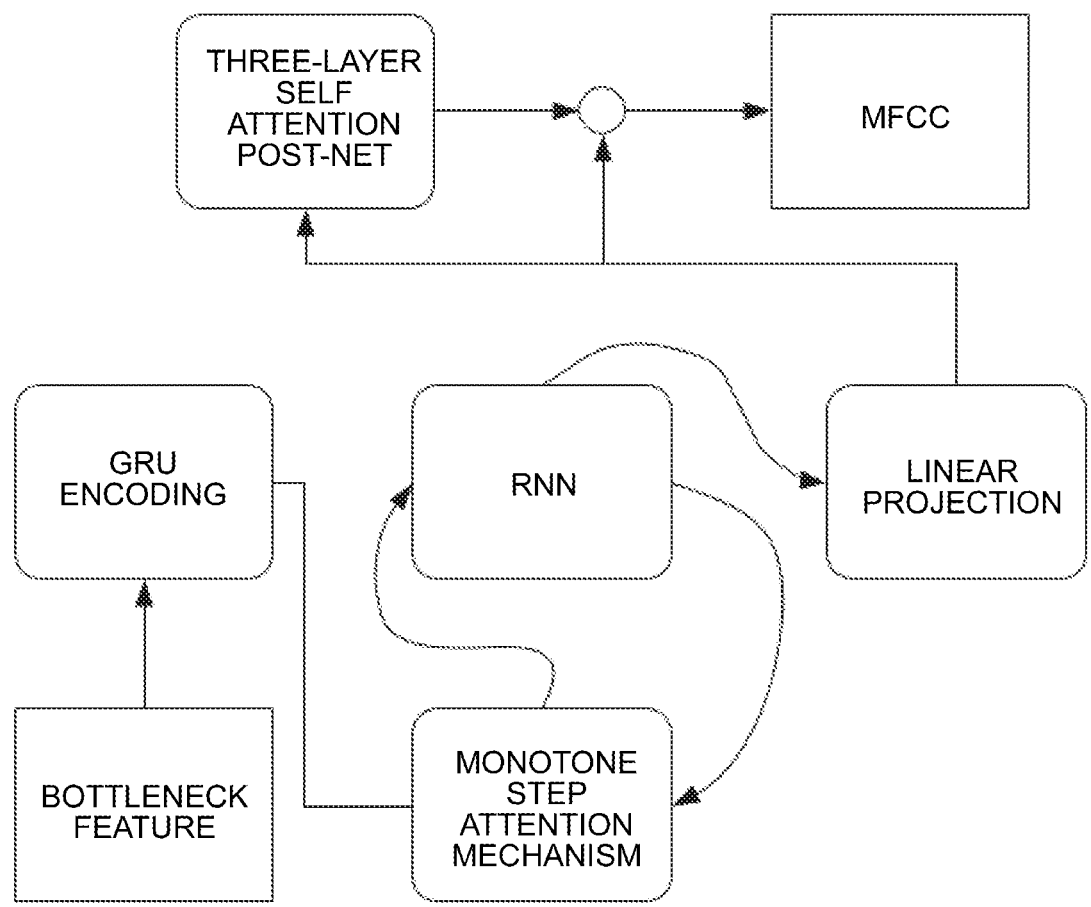
FIG. 5 is an architectural diagram of an Attention voice conversion network according to an embodiment of the present disclosure.

(2) An Attention voice conversion network, converting the bottleneck feature of the source speech into a mel-scale frequency cepstral coefficients feature in conformity with target speech;

The Attention voice conversion network is based on a seq2seq (sequence-to-sequence) architecture. Main improvements are in that: First, a BN feature outputted by the SI-ASR model is encoded as a high-dimensional feature by using a one-layer bidirectional RNN (Bidirectional Recurrent Neural Network). Second, in conjunction with an Attention mechanism, encoding and decoding are associated with each other, to avoid instability caused by manual alignment. Third, a BN feature is converted to an acoustic feature by using a simplified decoder network with a two-layer DNN network structure followed by a one-layer RNN structure and further using a multi-layer self Attention with a residual connection serving as a Post-Net (see FIG. 5 for details). GRU (gated recurrent unit) encoding refers to a gated recurrent unit encoding.

Compared with the PPG-based method, the voice conversion network according to this embodiment of the present disclosure uses the acoustic feature that is simpler and more direct. According to the PPG-based method, the PPG is converted into a feature required by a vocoder, and furthermore the audio is restored in conjunction with an F0 (fundamental frequency) feature and an AP (aperiodic component) feature by the vocoder. Because the F0 feature contains information about the speaker, voice upon conversion may be more saturated, but timbre is sacrificed. However, the Attention voice conversion network according to this embodiment of the present disclosure may directly predict and output all required vocoder parameters, without manually extracting filter features such as F0, AP. In this way, on one hand, designs of input/output and process of the network are greatly simplified to make the model simpler and more efficient; and on the other hand, the audio upon voice conversion is more like that of the target speaker. In addition, the network according to this embodiment of the present disclosure is relatively small in scale, has a quick operation speed, and may achieve voice conversion in a real-time. Currently, audio for 10 s needs only 1 s for conversion. Real-time voice conversion effects may be achieved through an engineering streaming package.

(3) A neural network vocoder, converting the mel-scale frequency cepstral coefficients feature in conformity with the target speech into audio to be outputted.

Figure 6:
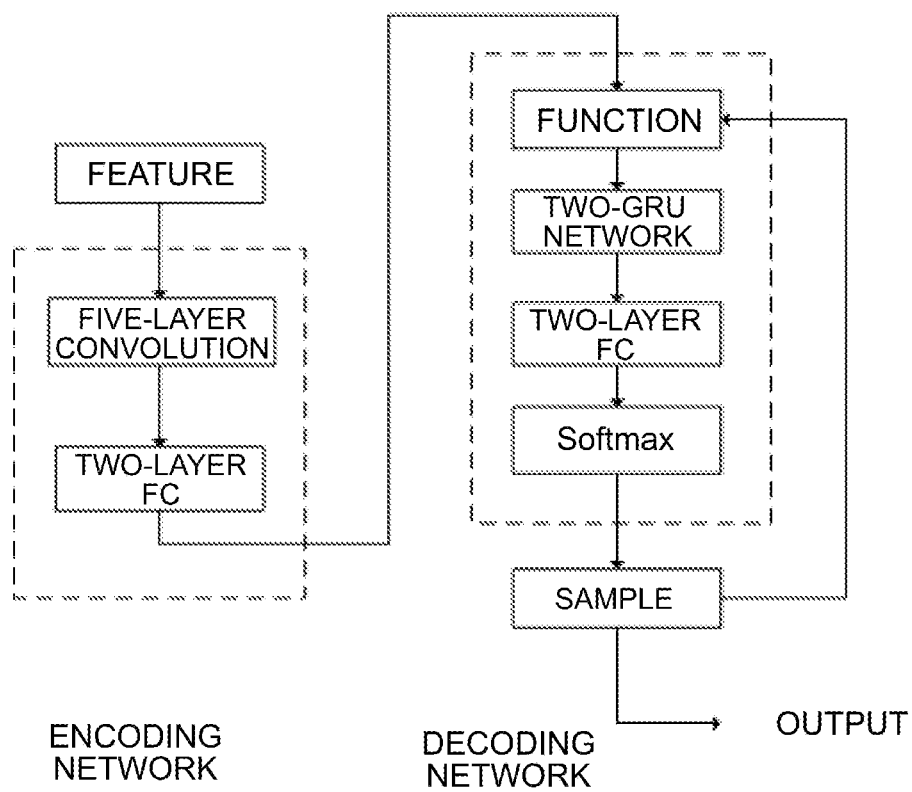
FIG. 6 is an architectural network diagram of a neural network vocoder according to an embodiment of the present disclosure.

The neural network vocoder uses a variant of WaveRNN, to restore the acoustic feature to the audio to be outputted. According to this embodiment of the present disclosure, the acoustic feature is encoded as a feature in a high-dimensional space, and then a high-dimensional feature is restored to the audio to be outputted by utilizing the recurrent neural network. For a specific vocoder structure of the neural network, reference is made to FIG. 6, where a two-GRU (Gated Recurrent Unit) network indicates a gated recurrent unit network, two-layer FC (Fully Connected) refers to two fully connected layers, and softmax is a normalized exponential function.

According to an embodiment of the present disclosure, there is further proposed a training method for a voice conversion system, including the following three parts of A1 to A3.

A1. A training phase of an SI-ASR model (speaker-independent automatic speech recognition model). At this phase, a feature at a training phase of an Attention voice conversion network and the SI-ASR model used for extracting a bottleneck feature (bottleneck feature in literal translation, also referred to as a BN feature for short) at a voice conversion phase are obtained through training. Training for the model is performed by using training corpus involving a lot of speakers. After the training, the model may be used for any source speaker. In other words, the speaker is independent (Speaker-Independent, SI). Therefore, the model is referred to as an SI-ASR model. After the training, the model is directly used later without being trained repeatedly.

The training phase of the SI-ASR model (speaker-independent automatic speech recognition model) includes the following steps (see FIG. 1).

B1. Preprocess multi-speaker ASR training corpus.

The preprocessing includes de-blanking and normalizing training audio. De-blanking indicates detecting and cutting away excessively long pauses and mute voice (not including normal pauses between words) in the audio. Normalization indicates standardising audio data within a range.

Text in the training corpus is cleaned and checked, to correct a case in which words do not accurately correspond to the audio. The text is regularized, to convert numerical digits, dates, decimal numbers, unit symbols, and the like into Chinese characters. If model training is performed by a unit of Chinese word, a Chinese word segmentation tool (such as jieba or pkuseg) needs to be invoked to segment the text by Chinese word. Subsequently, the text is converted into Pinyin and phonemes. All Chinese characters, Chinese words, Pinyin, or phonemes presenting in the corpus are counted to generate a glossary, and are all encoded to be represented by integers. The training is performed by a unit of phoneme.

B2. Extract a parameter, to obtain an MFCC feature (Mel-scale Frequency Cepstral Coefficients feature) of audio for the training corpus.

Mel-scale Frequency Cepstral Coefficients (MFCC for short) is one of the most frequently used phonetic features in the fields of speech recognition and speech synthesis. Such a feature does not rely on property of a signal, without suppose and limit on an input signal, and has good robustness, but also utilizes research results of an acoustic model, thus better conforming to acoustic properties of human ears. Moreover, when a signal-to-noise ratio is reduced, the feature still has better recognition performance. An extraction process of the MFCC includes the following steps: pre-emphasis, frame division, windowing, fast Fourier transform, mel filtering, a logarithmic operation, and discrete cosine transform.

B3. Train the SI-ASR model.

A Kaldi framework is used to train the SI-ASR model. Kaldi is an open-source speech recognition framework for researching applications. The model uses an architecture that is based on Deep Neural Network (DNN).

The text in the training corpus is converted into a number of character encoding, to be inputted to the SI-ASR model together with the MFCC feature of the audio. A backward propagation algorithm is executed to perform iterative optimization, until the model is converged.

Figure 7:
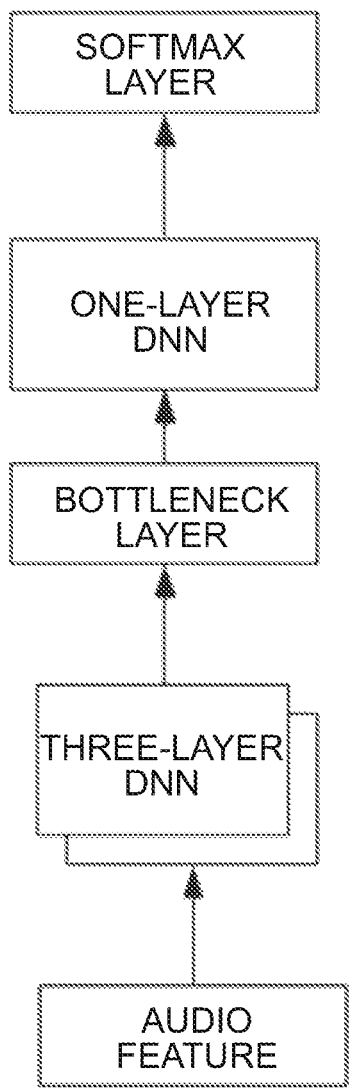
FIG. 7 is an architectural network diagram of a speaker-independent automatic speech recognition model (SI-ASR model) according to an embodiment of the present disclosure.

See FIG. 7 for the network architecture of the speaker-independent automatic speech recognition model (SI-ASR model).

A2. A training phase of the Attention voice conversion network. A voice conversion network based on a sequence-to-sequence architecture and an Attention mechanism (Attention voice conversion network for short below) is obtained through training at this phase, to convert the BN feature extracted by the SI-ASR model at the voice conversion phase into an acoustic feature required by the vocoder. The voice conversion network at this phase needs to be trained individually for different target speakers. After the training, timbre of voice of any source speaker may be converted into timbre of the target speaker.

Figure 2:
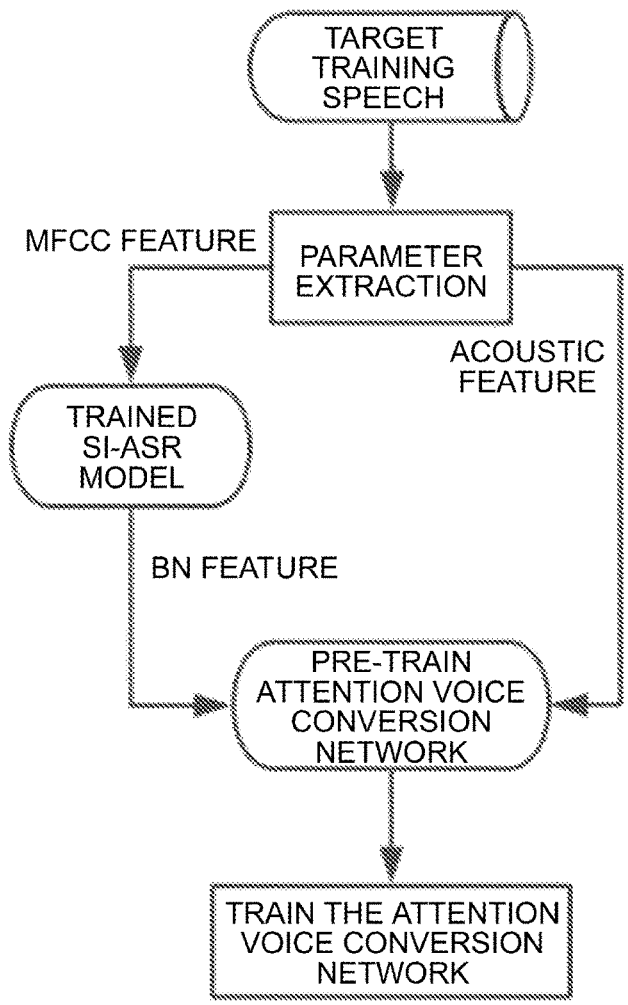
FIG. 2 is a flowchart of training for an Attention voice conversion network according to an embodiment of the present disclosure.

The training phase of the Attention voice conversion network includes the following steps (see FIG. 2).

C1. Preprocess target speech of the target speaker.

Preprocessing training speech includes noise reduction, de-blanking, volume normalization, and the like. Audio de-blanking and normalizing are the same as those at step B1. Regarding noise reduction, the training speech is processed by an existing noise reduction model, to reduce influence of noise.

About 5-20 min and 50-200 pieces of recorded audio are needed for converting voice of a person, thus greatly simplifying complex recording work. Moreover, voice conversion does not require text check. Therefore, these training audio are used for training the Attention voice conversion network, and are also used for training a neural network vocoder.

C2. Extract a parameter, to obtain an MFCC feature and an acoustic feature of the target speech.

An extraction of the MFCC feature is the same as that at step B2. The acoustic feature is a feature required by the neural network vocoder. At present, according to this embodiment of the present disclosure, a Mel spectrogram is used as an acoustic feature. To be more close to perception of human ears, the Mel spectrogram is used as an acoustic feature according to this embodiment of the present disclosure.

C3. Convert the MFCC feature into a BN feature by using the SI-ASR model trained at B3.

C4. Load a basic Attention voice conversion network that has been trained by a large scale of the corpus.

C5. Input the BN feature into the basic Attention voice conversion network, and take the acoustic feature as a ground truth, to train the model by a method of Deep Transfer Learning.

Theoretically, various languages do not significantly differ in pronunciations. Therefore, the method of Deep Transfer Learning can be used to reuse network parameters that are previously trained and features that are learned. In this way, degree of difficulty in model training, required volume of training data, and collection costs are greatly reduced.

A3. A training phase of the neural network vocoder. A vocoder based on the deep neural network (Deep NeuralNnetwork Vocoder) is obtained through training at this phase, to convert the acoustic feature into a target speech signal.

Figure 3:
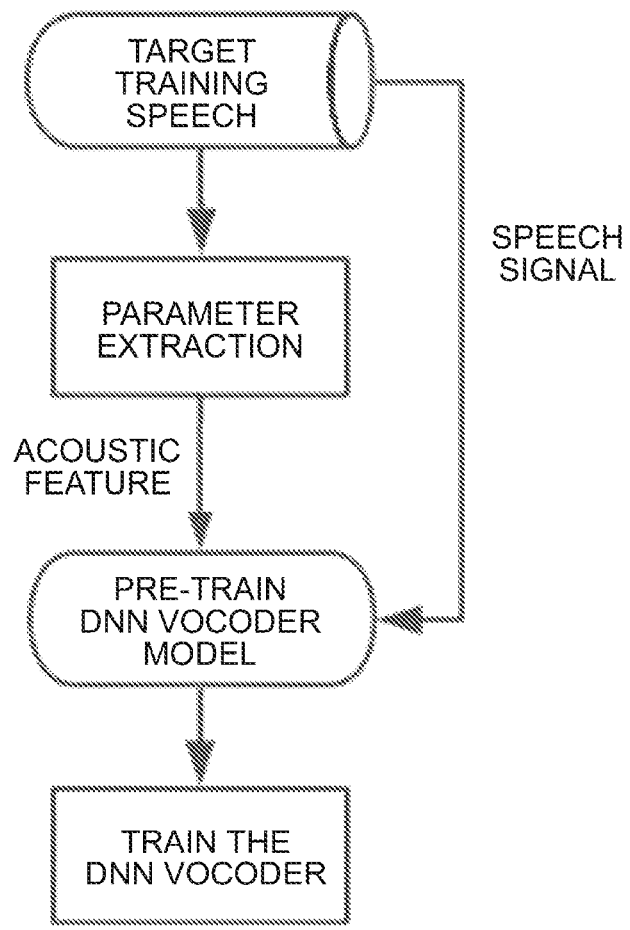
FIG. 3 is a flowchart of training for a neural network vocoder according to an embodiment of the present disclosure.

The training phase of the vocoder includes the following steps (see FIG. 3).

D1. Preprocess the target speech of the target speaker.

This step is the same as the preprocessing operation at C1.

D2. Extract a parameter, to obtain the acoustic feature of the target speech.

Different vocoders use different acoustic features. At present, the Mel spectrogram is used as the acoustic feature according to this embodiment of the present disclosure D3. Load a pre-trained vocoder model.

D4. Input the acoustic feature and a sound signal of the target speech into a pre-trained neural network vocoder model, to train the model by the method of Deep Transfer Learning.

Figure 4:
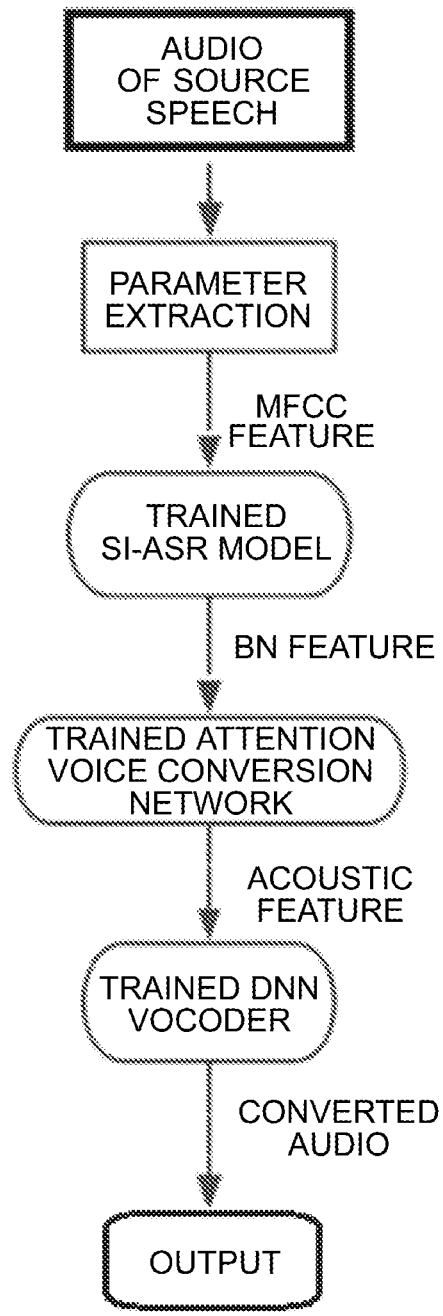
FIG. 4 is a flowchart of voice conversion according to an embodiment of the present disclosure.

According to an embodiment of the present disclosure, there is further provided a voice conversion method. A voice conversion is performed on an inputted source speech to convert it into a target speech signal to be outputted, i.e., the speech, sound of which conforms to vocal characteristics of a target speaker while spoken content of which is the same as the source speech. A voice conversion phase includes the following steps (see FIG. 4).

E1. Perform parameter extraction on to-be-converted source speech, to obtain an MFCC feature.

E2. Convert the MFCC feature into a BN feature by using the SI-ASR model trained at B3.

E3. Convert the BN feature into an acoustic feature (Mel spectrogram) by using the Attention voice conversion network trained at C5.

E4. Convert the acoustic feature (Mel spectrogram) into a speech to be outputted, by the neural network vocoder trained at D4.

According to such manner, the trained speaker-independent automatic speech recognition model may be used for any source speaker, that is, the speaker is independent (Speaker-Independent, SI). A training method for the speaker-independent automatic speech recognition model needs to be performed only for one time, and it is just needed for a subsequent small sample that a corresponding feature is extracted by using a trained model.

According to an embodiment of the present disclosure, there is further provided a terminal, which uses the voice conversion system described in the first embodiment.

The terminal may be a mobile terminal, a PC device, a wearable device, or the like that is equipped with an automatic voice response or prompt service system, or may be a speech robot having an automatic voice response or prompt service function, which is not limited by this embodiment of the present disclosure.

According to an embodiment of the present disclosure, there is further provided a computer-readable storage medium, in which a computer program is stored, wherein the computer program is configured to, when executed, implement the method described in the foregoing embodiment A4 to perform a voice conversion. The processes described according to A1 to A3 are used for model training.

The present disclosure further provides a voice conversion system, including a speech recognition model including at least a bottleneck layer, where the speech recognition model may be configured to: convert a mel-scale frequency cepstral coefficients feature of inputted source speech into a bottleneck feature through the bottleneck layer; and input the bottleneck feature to an Attention voice conversion network through the bottleneck layer.

The technical solution provided according to this embodiment of the present disclosure is applied to a scenario in which speech (source speech) spoken by a source speaker needs to be converted into speech matching a target speaker. In other words, the source speech is source speech spoken by the source speaker before conversion is started. In actual applications, the speech recognition model is trained with a lot of training corpus, and the trained speech recognition model may be applied to any source speaker. In other words, the speech recognition model is independent.

Specifically, the speech recognition model may include a five-layer DNN structure, in which a third layer or a fourth layer may be the bottleneck layer. Optionally, the bottleneck layer is placed at the fourth layer of the ASR model, to avoid possible interference by timbre information at other positions.

The Attention voice conversion network may be configured to convert the inputted bottleneck feature into a mel-scale frequency cepstral coefficients feature in conformity with a target speech.

In this embodiment, the target speech is speech spoken by the target speaker. Therefore, in order to covert the source speech into speech in conformity with the target speech, the bottleneck feature of the source speech is converted into the mel-scale frequency cepstral coefficients feature in conformity with the target speech by the Attention voice conversion network.

The Attention voice conversion network may include a one-layer bidirectional RNN structure.

According to the technical solutions provided in the present disclosure, a neural network vocoder is further included. The neural network vocoder may be configured to convert the mel-scale frequency cepstral coefficients feature in conformity with the target speech into pseudo target speech and output the pseudo target speech, and the pseudo target speech is audio generated upon the converting of the source speech.

In actual applications, the neural network vocoder can convert the mel-scale frequency cepstral coefficients feature into audio to be outputted, and the generated audio is the pseudo target speech. In other words, the pseudo target speech is speech in conformity with the target speech. Voice conversion is achieved through the foregoing processing.

The present disclosure further provides a training method for a voice conversion system, which is applied to the voice conversion system described in the foregoing embodiments, and includes the following steps.

S1: Convert words in multi-speaker speech recognition training corpus into numbers based on a mapping relationship between the words in the multi-speaker speech recognition training corpus and character encodings.

In the technical solutions of the present disclosure, the character encoding refers to a conversion form of converting any input character to a fixed form. It should be noted that a Chinese character needs to be converted into a corresponding phoneme, so that a neural network calculation may be performed on it. The character encoding may use an ASCII code, or may be in another form; this is not specifically limited by the present disclosure.

S2: Input the converted number and a mel-scale frequency cepstral coefficients feature of the multi-speaker speech recognition training corpus to the speech recognition model.

S3: Execute a backward propagation algorithm.

S4: Perform iterative optimization until the speech recognition model is converged, to train the speech recognition model.

Training the speech recognition model is a process of establishing a relationship between the model and the training corpus. According to this embodiment, specific text content in the training corpus is not limited by the present disclosure.

The method further includes preprocessing the multi-speaker speech recognition training corpus. Preprocessing includes de-blanking and normalizing. According to this embodiment, a de-blanking process can remove excessively long pauses, mute voice, and the like in the training corpus, to improve the quality of the training corpus. A normalization process is normalizing volume of the training corpus. If the volume of the training corpus is loud or small from time to time, training effects may be affected. Therefore, the volume of the training corpus is controlled within a range through normalization. A specific range may be designed according to actual conditions; this is not specifically limited by the present disclosure.

The method further includes the following steps.

S5: Convert a mel-scale frequency cepstral coefficients feature of target speech into a bottleneck feature.

S6: Input the bottleneck feature of the target speech to the Attention voice conversion network, wherein the mel-scale frequency cepstral coefficients feature of the target speech, as a ground truth, is inputted to the Attention voice conversion network.

S7: Train the Attention voice conversion network by a method of Deep Transfer Learning.

In this embodiment, the target speech is speech spoken by the target speaker in a training process. Training the Attention voice conversion network with the target speech can establish a relationship between the target speech and the Attention voice conversion network, so that the Attention voice conversion network can convert the bottleneck feature of the source speech into the mel-scale frequency cepstral coefficients feature in conformity with the target speech.

In some embodiments of the present disclosure, the step of converting the mel-scale frequency cepstral coefficients feature of the target speech into the bottleneck feature is performed by the speech recognition model that is pre-trained.

The method further includes the following steps.

S8: Input the mel-scale frequency cepstral coefficients feature of the target speech and the target speech to the neural network vocoder.

S9: Train the neural network vocoder by the method of Deep Transfer Learning.

In this embodiment, the neural network vocoder is trained according to a relationship between the mel-scale frequency cepstral coefficients feature of the target speech and a sound signal of the target speech, so that the neural network vocoder can convert the mel-scale frequency cepstral coefficients feature in conformity with the target speech into audio and output the same.

The method further includes preprocessing the target speech. Preprocessing includes de-blanking and normalizing.

In this embodiment, de-blanking and normalizing can prevent excessively long pauses, mute voice, too loud or too small volume, and the like in the audio from affecting subsequent processes of training the Attention voice conversion network and the neural network vocoder.

The method further includes extracting a parameter, to obtain the mel-scale frequency cepstral coefficients feature of the multi-speaker speech recognition training corpus, the mel-scale frequency cepstral coefficients feature of the target speech, and the mel-scale frequency cepstral coefficients feature of the source speech.

It may be learned from the foregoing technical solutions that the voice conversion system and the training method for a voice conversion system provided in the present disclosure can convert, on the basis of a source speech spoken by any source speaker and a target speech spoken by a target speaker, the source speech into audio in conformity with the target speech to be outputted, having good practicability.

The foregoing embodiments are merely intended for describing the technical solutions of the present disclosure, but not for limiting the present disclosure. Although the present disclosure is described in detail with reference to the preferable embodiments, persons of ordinary skill in the art should understand that modifications or equivalent replacements may be made to the technical solutions of the present disclosure, without departing from the purpose and scope of the technical solutions of the present disclosure, and the modifications and the equivalent replacements shall all fall within the scope of the claims of the present disclosure. Technologies, shapes, and constructions of the present disclosure that are not described in detail are all common general knowledge.

What is claimed is:

1. A voice conversion system, comprising:
    a speaker-independent automatic speech recognition model, comprising at least a bottleneck layer, configured to: convert a mel-scale frequency cepstral coefficients feature of an inputted source speech into a bottleneck feature of the source speech through the bottleneck layer, and output the bottleneck feature of the source speech to an Attention voice conversion network through the bottleneck layer;
    where a training method for the speaker-independent automatic speech recognition model comprises:
    inputting a number of a character encoding to which a word in a multi-speaker speech recognition training corpus is converted, together with a mel-scale frequency cepstral coefficients feature of the multi-speaker speech recognition training corpus, to the speaker-independent automatic speech recognition model; executing a backward propagation algorithm; and performing iterative optimization until the speaker-independent automatic speech recognition model is converged;
    the Attention voice conversion network configured to convert the bottleneck feature of the source speech into a mel-scale frequency cepstral coefficients feature in conformity with a target speech; and
    a neural network vocoder configured to convert the mel-scale frequency cepstral coefficients feature in conformity with the target speech into and output audio.

2. A training method for a voice conversion system, applicable to the voice conversion system according to claim 1, wherein a training method for the speaker-independent automatic speech recognition model comprises:
    inputting a number of a character encoding to which a word in a multi-speaker speech recognition training corpus is converted, together with a mel-scale frequency cepstral coefficients feature of the multi-speaker speech recognition training corpus, to the speaker-independent automatic speech recognition model;
    executing a backward propagation algorithm; and
    performing iterative optimization until the speaker-independent automatic speech recognition model is converged.

3. The training method for the voice conversion system according to claim 2, wherein the training method for the speaker-independent automatic speech recognition model further comprises preprocessing the multi-speaker speech recognition training corpus, wherein the preprocessing comprises de-blanking and normalizing.

4. The training method for the voice conversion system according to claim 3, further comprising extracting a parameter to obtain the mel-scale frequency cepstral coefficients feature of the multi-speaker speech recognition training corpus, a mel-scale frequency cepstral coefficients feature of a target speech, and a mel-scale frequency cepstral coefficients feature of a source speech.

5. The training method for the voice conversion system according to claim 2, characterized by further comprising extracting a parameter to obtain the mel-scale frequency cepstral coefficients feature of the multi-speaker speech recognition training corpus, a mel-scale frequency cepstral coefficients feature of a target speech, and a mel-scale frequency cepstral coefficients feature of a source speech.

6. A training method for a voice conversion system, applicable to the voice conversion system according to claim 1, wherein a training method for the Attention voice conversion network comprises:
    converting a mel-scale frequency cepstral coefficients feature of a target speech into a bottleneck feature of the target speech;
    inputting the bottleneck feature of the target speech to a basic Attention voice conversion network, with the mel-scale frequency cepstral coefficients feature corresponding to the target speaker as a ground truth, and training the Attention voice conversion network by a method of Deep Transfer Learning.

7. The training method for the voice conversion system according to claim 6, wherein the converting of the mel-scale frequency cepstral coefficients feature of the target speech into the bottleneck feature of the target speech is performed by using the speaker-independent automatic speech recognition model that is pre-trained.

8. The training method for the voice conversion system according to claim 7, further comprising preprocessing the target speech, wherein the preprocessing comprises de-blanking and normalizing.

9. The training method for the voice conversion system according to claim 7, further comprising extracting a parameter to obtain the mel-scale frequency cepstral coefficients feature of the multi-speaker speech recognition training corpus, a mel-scale frequency cepstral coefficients feature of a target speech, and a mel-scale frequency cepstral coefficients feature of a source speech.

10. The training method for the voice conversion system according to claim 6, further comprising preprocessing the target speech, wherein the preprocessing comprises de-blanking and normalizing.

11. The training method for the voice conversion system according to claim 6, further comprising extracting a parameter to obtain the mel-scale frequency cepstral coefficients feature of the multi-speaker speech recognition training corpus, a mel-scale frequency cepstral coefficients feature of a target speech, and a mel-scale frequency cepstral coefficients feature of a source speech.

12. A training method for a voice conversion system, applicable to the voice conversion system according to claim 1, wherein a training method for the neural network vocoder comprises:
    inputting a mel-scale frequency cepstral coefficients feature of a target speech and the target speech to the neural network vocoder that is pre-trained; and
    training the neural network vocoder by a method of Deep Transfer Learning.

13. The training method for the voice conversion system according to claim 12, further comprising preprocessing the target speech, wherein the preprocessing comprises de-blanking and normalizing.

14. The training method for the voice conversion system according to claim 12, further comprising extracting a parameter to obtain the mel-scale frequency cepstral coefficients feature of the multi-speaker speech recognition training corpus, a mel-scale frequency cepstral coefficients feature of a target speech, and a mel-scale frequency cepstral coefficients feature of a source speech.

15. A voice conversion method, characterized by comprising steps of:
    by a speaker-independent automatic speech recognition model, converting a mel-scale frequency cepstral coefficients feature of an inputted source speech into a bottleneck feature of the source speech through the bottleneck layer, and outputting the bottleneck feature of the source speech to an Attention voice conversion network through the bottleneck layer;
    where a training method for the speaker-independent automatic speech recognition model comprises:
    inputting a number of a character encoding to which a word in a multi-speaker speech recognition training corpus is converted, together with a mel-scale frequency cepstral coefficients feature of the multi-speaker speech recognition training corpus, to the speaker-independent automatic speech recognition model; executing a backward propagation algorithm; and performing iterative optimization until the speaker-independent automatic speech recognition model is converged;
    converting, by the Attention voice conversion network, the bottleneck feature of the source speech into a mel-scale frequency cepstral coefficients feature in conformity with a target speech; and
    converting, by a neural network vocoder, the mel-scale frequency cepstral coefficients feature in conformity with the target speech into and output audio.

16. A terminal comprising the voice conversion system according to claim 1.

17. A non-transitory computer readable storage medium, wherein a computer program is stored in the computer-readable storage medium, wherein the computer program is configured to, when executed, perform the method according to claim 2.

18. A non-transitory computer-readable storage medium, wherein a computer program is stored in the non-transitory computer-readable storage medium, wherein the computer program is configured to, when executed, perform the method according to claim 6.

19. A non-transitory computer-readable storage medium, wherein a computer program is stored in the non-transitory computer-readable storage medium, wherein the computer program is configured to, when executed, perform the method according to claim 12.

* * * * *